United States Patent [19]

Stepp

[11] Patent Number: 5,484,871
[45] Date of Patent: Jan. 16, 1996

[54] ORGANOPOLYSILOXANES CONTAINING HYDROPHILLIC GROUPS

[75] Inventor: Michael Stepp, Burghausen, Germany

[73] Assignee: Wacker-Chemie GmbH, Munich, Germany

[21] Appl. No.: 299,382

[22] Filed: Sep. 1, 1994

[30] Foreign Application Priority Data

Sep. 10, 1993 [DE] Germany .......................... 43 30 735.3

[51] Int. Cl.$^6$ .................................................. C08G 77/12
[52] U.S. Cl. ................................ 528/31; 528/14; 528/21; 528/30; 528/34; 528/23
[58] Field of Search ................................ 528/23, 31, 30, 528/34, 14, 21

[56] References Cited

U.S. PATENT DOCUMENTS

| | | |
|---|---|---|
| 3,565,845 | 2/1971 | Johnson et al. . |
| 3,839,388 | 10/1974 | Nitzsche et al. . |
| 4,283,519 | 8/1981 | Pines et al. . |
| 4,552,919 | 11/1985 | Mikami et al. . |
| 4,657,959 | 4/1987 | Bryan et al. . |
| 5,008,229 | 4/1991 | Schuster et al. . |
| 5,210,129 | 5/1993 | de La Croi Habimana ............. 528/23 |
| 5,304,621 | 4/1994 | Staiger et al. . |

FOREIGN PATENT DOCUMENTS

| | | |
|---|---|---|
| 0032310 | 7/1981 | European Pat. Off. . |
| 1947268 | 8/1970 | Germany . |
| 2229514 | 1/1979 | Germany . |
| 4120418 | 12/1992 | Germany . |
| WO87/03001 | 5/1987 | WIPO . |
| WO91/00795 | 1/1991 | WIPO . |
| 9116371 | 10/1991 | WIPO . |
| 9219667 | 11/1992 | WIPO . |
| 9221724 | 12/1992 | WIPO . |
| WO93/00405 | 1/1993 | WIPO . |

OTHER PUBLICATIONS

"Hydroxyorganosilanes and Their Esters" in Chemistry and Technology of Silicones by Walter Noll, pp. 163–171.

Primary Examiner—Melvyn I. Marquis
Attorney, Agent, or Firm—Martin Connaughton

[57] ABSTRACT

The invention relates to organopolysiloxanes containing hydrophilic groups, processes for their preparation and their use in organopolysiloxane compositions which are crosslinkable upon intake of moisture.

7 Claims, No Drawings

ORGANOPOLYSILOXANES CONTAINING HYDROPHILLIC GROUPS

FIELD OF THE INVENTION

The present invention relates to organopolysiloxanes containing hydrophilic groups, processes for their preparation and their use in organopolysiloxane compositions which are crosslinkable upon intake of moisture.

In the present invention, the term organopolysiloxanes also includes oligomeric siloxanes.

BACKGROUND OF INVENTION

Owing to their low polarity, diorganopolysiloxanes most often exhibit a hydrophobic surface. It is of great importance to increase their hydrophilicity, for example, in silicone-based dental impression compounds in order to improve water wettability, in sealing compounds in order to improve overcoatability with aqueous emulsion paints, and in the surface treatment of fibers or textiles in order to improve the handle. The use of organopolysiloxanes containing polar groups allows the modification of the polarity and thus the surface energy in such a manner that the hydrophilicity of the siloxane is improved. Owing to their commercial availability, their neutrality and the relatively high chemical stability, polyether radicals are often used as the polar groups. See U.S. Pat. No. 3,565,845 (Union Carbide Corp; issued on Feb. 23, 1971) and corresponding DE-B 1,947,268 and U.S. Pat. No. 4,657,959 (Minnesota Mining Mfg Co., issued on Apr. 14, 1987) and corresponding WO-A 87/03001.

In cases wherein crosslinkability of the hydrophilic organopolysiloxane is desirable, in order to increase the durability of the hydrophilic properties the siloxane skeleton must contain further crosslinkable groups. See U.S. Pat. No. 4,283,519 (Union Carbide Corp., issued on Jul. 22, 1981) and the corresponding EP-A 32310 and U.S. Pat. No. 4,552,919 (Toray Silicone Co. Ltd., issued on Nov. 12, 1985). The disadvantage of such compositions is that crosslinking of the hydrolyzable functions upon intake of moisture is only possible at elevated temperature and/or in the presence of metal catalysts.

SUMMARY OF INVENTION

The present invention relates to organopolysiloxanes comprising at least one unit (A) of the formula $$(R^3O)_m SiHR_{2-m}O_{1/2} \tag{I}$$

and at least one unit (B) selected from the group consisting of $ER_2SiO_{1/2}$, $ERSiO_{2/2}$ and $ESiO_{3/2}$, in which R is monovalent SiC-bonded optionally substituted hydrocarbon radicals having 1 to 12 carbon atoms, $R^3$ is monovalent optionally substituted hydrocarbon radicals, m is 1 or 2, and E is a radical of the formula

$$-R^1_n[OY]_x R^2 \tag{II}$$

in which $R^1$ is an alkylene radical having 1 to 6 carbon atoms, n is 0 or 1,

Y consists of alkylene groups having 1 to 4 carbon atoms, $R^2$ is an alkoxy radical having 1 to 6 carbon atoms or an oxycarbonylalkyl radical having 1 to 6 carbon atoms, and x is an integer from 1 to 200.

The proportion of siloxane units (A) is preferably between 0.2% and 67%, more preferably between 1% and 10%, relative to the total number of the siloxane units present in the organopolysiloxane.

The proportion of siloxane units (B) is preferably between 1% and 70%, more preferably between 1% and 40%, relative to the total number of the siloxane units present in the organopolysiloxane.

The organopolysiloxanes containing hydrophilic groups are preferably those of the formula

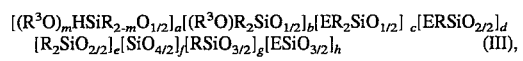

$$[(R^3O)_m HSiR_{2-m}O_{1/2}]_a[(R^3O)R_2SiO_{1/2}]_b[ER_2SiO_{1/2}]_c[ERSiO_{2/2}]_d \\ [R_2SiO_{2/2}]_e[SiO_{4/2}]_f[RSiO_{3/2}]_g[ESiO_{3/2}]_h \tag{III}$$

in which

R, E, $R^3$ and m have the above mentioned meaning and a is from 1 to 8, b and c are each from 0 to 8, d is 0 to 280, e is 0 to 396, f is 0 to 3, g is 0 to 6, and h is 0 to 3, wherein a+b+c is 2 to 8, c+d+h is 1 to 280, a+b+c+d+e+f+g+h is 3 to 400, and the ratio of the sum of a+b+e+f+g to that of c+d+h is 100:1 to 1:1.

Examples of radicals R are alkyl radicals, such as methyl, ethyl, n-propyl, iso-propyl, n-butyl, iso-butyl, tert-butyl, sec-butyl, n-pentyl, iso-pentyl, neo-pentyl, tert-pentyl radicals, hexyl radicals, such as n-hexyl, heptyl radicals, such as n-heptyl, octyl radicals, such as n-octyl, and iso-octyl radicals, such as 2,2,4-trimethylpentyl and 2-ethylhexyl, nonyl radicals, such as n-nonyl, decyl radicals, such as n-decyl, dodecyl radicals, such as n-dodecyl; alkenyl radicals, such as vinyl, allyl, 5-hexen-1-yl, E-4-hexen-1-yl, Z-4-hexen-1-yl, 2-(3-cyclohexenyl) ethyl and cyclododeca-4,8-dienyl radicals, cycloalkyl radicals, such as cyclopentyl, cyclohexyl, cycloheptyl radicals and methylcyclohexyl radicals; aryl radicals, such as phenyl and naphthyl; alkaryl radicals, such as o-, m-, p-tolyl radicals, xylyl radicals and ethylphenyl radicals; aralkyl radicals, such as benzyl, α- and β-phenylethyl and 2-phenyl-1-propyl.

Examples of substituted hydrocarbon radicals R are halogen-substituted hydrocarbon radicals having 1 to 12 carbon atoms, such as alkyl radicals substituted by fluorine, chlorine, bromine and iodine atoms, such as 3,3,3-trifluoro-n-propyl, 2,2,2,2',2',2'-hexafluoroisopropyl, heptafluoroisopropyl, and haloaryl radicals, such as o-, m- and p-chlorophenyl and mercapto-substituted hydrocarbon radicals having 1 to 12 carbon atoms, such as —$(CH_2)_3SH$, —$(CH_2)_6SH$, —$(CH_2)_4CH(SH)CH_3$, 2-(3-mercapto-1-cyclohexyl)-1-ethyl, 2-(3,4-dimercapto-1-cyclohexyl)-1-ethyl, —$(CH_2)_3O(CH_2)_3SH$, —$(CH_2)_3OCH_2CH(SH)CH_2SH$, —$(CH_2)_3OCH_2CH(SH)CH_3$, —$(CH_2)_3OOC$—$CH_2SH$, —$(CH_2)_3OOC(CH_2)_2SH$, —$(CH_2)_8SH$, —$(CH_2)_6CH(SH)CH_3$, —$(CH_2)_7SH$, —$CH_2SH$, —$(CH_2)_2SH$, —$(CH_2)_5CH=CH(CH_2)_5SH$, —$(CH_2)_5CH=CH(CH_2)_3CH(SH)CH_3$, —$(CH_2)_5CH(SH)(CH_2)_4CH=CH_2$,

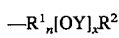

—(CH$_2$)$_6$CH(SH)(CH$_2$)$_3$CH=CH$_2$,
—(CH$_2$)$_6$CH(SH)(CH$_2$)$_3$CH(SH)CH$_3$,
—(CH$_2$)$_5$CH(SH)(CH$_2$)$_4$CH(SH)CH$_3$,
—(CH$_2$)$_5$CH(SH)(CH$_2$)$_6$SH,  —(CH$_2$)$_6$CH(SH)(CH$_2$)$_6$SH, 1-mercapto-4-cyclododec-8-enyl, 1-mercapto-5-cyclododec-8-enyl, 1,6-dimercapto-10-cyclododecyl, 1-mercapto-2-cyclobutyl, 1-mercapto-3-cyclobutyl, 1-mercapto-2-cyclopentyl, 1-mercapto-3-cyclopentyl, 1-mercapto-2-cyclohexyl, 1-mercapto-3-cyclohexyl, 1-mercapto-4-cyclohexyl, 1-mercapto-2-cycloheptyl, 1-mercapto-3-cycloheptyl, 1-mercapto-4-cycloheptyl, 1-mercapto-2-cyclooctyl, 1-mercapto-3-cyclooctyl, 1-mercapto-4-cyclooctyl, 1-mercapto-5-cyclooctyl, 1,2-dimercapto-4-cyclohexyl, 1-mercaptocyclohex-3-en-3-yl, 1-mercaptocyclohex-3-en-4-yl, 1-mercaptocyclohex-2-en-4-yl, —(CH$_2$)$_3$SCH$_2$CH(SH)CH$_2$SH, —(CH$_2$)$_3$S(CH$_2$)$_3$SH, -ortho—(CH$_2$)$_3$OC$_6$H$_4$SH, -meta—(CH$_2$)$_3$OC$_6$H$_4$SH, -para—(CH$_2$)$_3$OC$_6$H$_4$SH, -ortho-(CH$_2$)$_3$OC$_6$H$_4$O(CH$_2$)$_3$SH, -meta—(CH$_2$)$_3$OC$_6$H$_4$O(CH$_2$)$_3$SH, -para—(CH$_2$)$_3$OC$_6$H$_4$O(CH$_2$)$_3$SH, -ortho—(CH$_2$)$_3$C$_6$H$_4$SH, -meta—(CH$_2$)$_3$C$_6$H$_4$SH, -para—(CH$_2$)$_3$C$_6$H$_4$SH, -ortho-C$_6$H$_4$SH, -meta-C$_6$H$_4$SH, -para-C$_6$H$_4$SH, —(CH$_2$)OOC(CH$_2$)$_{11}$SH and —(CH$_2$)$_3$OOC(CH$_2$)$_9$CH(SH)CH$_3$.

Preferred radicals R are methyl, phenyl, vinyl, allyl, 5-hexen-1-yl radicals and linear thioalkyl radicals, such as —(CH$_2$)$_3$SH, —(CH$_2$)$_6$SH and —(CH$_2$)$_4$CH(SH)CH$_3$, methyl, vinyl and —(CH$_2$)$_3$SH radicals being more preferred.

Preferred radicals R$^3$ are monovalent hydrocarbon radicals having 1 to 13 carbon atoms which may be substituted by ether oxygen atoms.

Examples of radicals R$^3$ are the examples of alkyl and cycloalkyl radicals given for radical R and —(CH$_2$)$_2$—OCH$_3$, —(CH$_2$)$_2$OCH$_2$CH$_3$ and —(CH$_2$)$_2$—OCH$_3$.

Preferred radicals R$^3$ are methyl, ethyl, n-propyl, iso-propyl, n-butyl and sec-butyl radicals, the ethyl radical being more preferred.

Examples of R$^1$ are linear or branched alkylene radicals, such as methylene, ethylene, n-propylene, iso-propylene, 1-n-butylene, 2-n-butylene, iso-butylene, tert-butylene, n-pentylene, iso-pentylene, neo-pentylene, tert-pentylene and n-hexylene radicals.

Preferred radicals R$^1$ are —CH$_2$—, —(CH$_2$)$_2$—, —(CH$_2$)$_3$— and —CH$_2$CH(CH$_3$)—, —(CH$_2$)$_3$— being more preferred.

Examples of Y are the examples of divalent alkylene radicals having 1 to 4 carbon atoms given for radical R$^1$.

Preferred radicals Y are —CH$_2$—, —(CH$_2$)$_2$—, —(CH$_2$)$_3$— and —CH$_2$CH(CH$_3$)—, —(CH$_2$)$_2$— being more preferred.

Radicals R$^2$ as alkoxy radicals are linear or branched alkyl radicals having 1 to 6 carbon atoms bonded via an oxygen atom. Radicals R$^2$ as oxycarbonylalkyl radicals are carboxyl radicals having a linear or branched alkyl radical. Examples of such alkyl radicals are the alkyl radicals having 1 to 6 carbon atoms given for radical R.

Preferred radicals R$^2$ are alkoxy radicals, such as methoxy, ethoxy, n-propoxy and n-butoxy radicals, and oxycarbonylalkyl radicals, such as HCOO—, H$_3$CCOO— and (H$_3$C)$_2$CHCOO— radicals, methoxy, ethoxy and n-butoxy radicals and H$_3$CCOO— being more preferred.

Preferably, m is 2.

x is preferably an integer between 3 and 60, more preferably between 3 and 15.

Apart from the siloxane units mentioned in formula (III), further siloxane units such as [(R$^3$O)$_{m-1}$HSiR$_{2-m}$O$_{2/2}$] and [(R$^3$O)$_3$SiO$_{1/2}$] where R, R$^3$ and m have the above mentioned meaning, can additionally be present to a minor extent as a result of preparation.

In formula (III), the ratio of a+b+e+f+g to x.(c+d+h) is preferably 10:90 to 99:1, more preferably 20:80 to 90:10.

The properties of the organopolysiloxanes containing hydrophilic groups can be adjusted in a simple manner by varying the ratios of the various siloxane units to one another and the type of the radical E of the formula (II). Thus, in formula (III), large values of e and small values of c, d, h and x improve the miscibility of these compounds with dialkylpolysiloxanes. In contrast, small values of e and large values of c, d, h and x increase the hydrophilicity of the organopolysiloxanes with c, d, e, h and x having the meaning given above.

If the organopolysiloxanes are intended to be crosslinked in the presence of moisture, it is advantageous to select those siloxanes of formula (III) whose a:b+c ratio is greater than or equal to 2:3, more preferably greater than or equal to 3:2.

If the organopolysiloxanes contain SiC-bonded mercapto-substituted hydrocarbon radicals and SiC-bonded radicals having an aliphatic carbon-carbon multiple bond, crosslinking is also possible by irradiation with electromagnetic radiation, resulting in the formation of so-called dual cure systems. See for example, WO 93/00405 (Wacker-Chemie GmbH; issued on Jan. 7, 1993).

In order to ensure sufficient photocrosslinkability of the organopolysiloxanes, the ratio of SiC-bonded mercapto-substituted hydrocarbon radicals to the SiC-bonded radicals having an aliphatic carbon-carbon multiple bond is chosen such that it is preferably between 10:1 and 1:10, more preferably between 5:1 and 1:5, especially between 2:1 and 1:2.

The organopolysiloxanes containing hydrophilic groups preferably have a molecular weight of 500 to 100,000, more preferably 1500 to 60,000.

The organopolysiloxanes containing hydrophilic groups have the advantage of being able to crosslink rapidly upon intake of moisture. Furthermore, they have the advantage of crosslinking very effectively without addition of metal catalysts, such as tin catalysts and titanium catalysts. Their pot life can be adjusted as desired without problems by addition of suitable Brönsted acids.

The organopolysiloxanes containing hydrophilic groups can be prepared by methods customary in silicon chemistry. They can be prepared by reacting organopolysiloxanes or organosilanes containing not only at least one terminal hydroxyl group but also at least one siloxane unit (B) with hydrogenorganyloxysilanes by the procedure described in the international application under the file number PCT/EP91/00795 (Wacker-Chemie GmbH, submitted on Apr. 25, 1991) and corresponding U.S. Pat. No. 5,304,621, issued on Apr. 19, 1994. The stoichiometry of the reactants is chosen such that at least one siloxane unit (A) is present in the reaction product. The organopolysiloxanes containing not only at least one terminal hydroxyl group but also at least one siloxane unit (B) can be prepared by co-hydrolysis of chloro-, acyloxy- or alkoxysilanes, preferably at a pressure of 900 to 1100 hPa and a temperature of 20° to 180° C. See W. Noll "Chemie und Technologie der Silicone", Verlag Chemie Weinheim, 2nd ed. 1968, page 163ff.

The organopolysiloxanes are preferably prepared in a first step by mixed hydrolysis or equilibration and mixed condensation of a silane of the formula ERSiZ$_2$ (IV), with compounds selected from the group consisting of silanes of the formula $$R_2SiZ_2 \tag{V}$$

organopolysiloxanes of the formula $$HO(SiR_2O)_iH \tag{VI}$$

and cyclic siloxanes of the formula $$(SiR_2O)_j \tag{VII}$$

followed by reaction of the hydroxyl-containing organosilicon compound thus obtained in a second step with a silane of the formula $$(R^3O)_mHSiR_{2-m}X \tag{XII}$$

in which

E, R, R³ and m have the above mentioned meaning,

Z is a hydroxyl group or a group which can be easily hydrolyzed, such as a halogen atom, an alkoxy radical or an oxycarbonylalkyl radical, i is an integer from 2 to 2000, j is an integer from 3 to 6, and X is a group which can be easily eliminated, such as a halogen atom and —OR³, —NR—C(=O)R, —OC(=O)R and —NR₂ radicals.

To prepare organopolysiloxanes of formula (III) where c>0, silanes of the formula $$ER_2SiZ \tag{VIII}$$

where

E, R and Z have the above mentioned meaning, are added.

To prepare organopolysiloxanes of formula (III) where h>0, silanes of the formula $$ESiZ_3 \tag{IX}$$

where

E and Z have the above mentioned meaning, are added.

To prepare organopolysiloxanes of formula (III) where f>0, silanes of the formula $$SiZ_4 \tag{X}$$

where

Z has the above mentioned meaning, are added.

To prepare organopolysiloxanes of formula (III) where g>0, silanes of the formula $$RSiZ_3 \tag{XI}$$

where

R and Z have the above mentioned meaning, are added.

In the process, the silanes of formulae (IV), (V), (VIII), (IX), (X) and (XI) can also be used in the form of homo- or co-oligomers, which are formed by complete or incomplete hydrolysis and condensation, as can be mixtures of silanes of formulae (IV), (V), (VIII), (IX), (X) and (XI) and homo- or co-oligomers thereof.

Examples of the radical Z are fluorine, chlorine, bromine and iodine atoms and methoxy, ethoxy, n-propoxy, iso-propoxy, n-butoxy sec-butoxy, iso-butoxy, 2-methoxyethyl, 2-butoxyethyl, acetoxy and formyloxy radicals, preferably chlorine, methoxy, ethoxy, iso-propoxy and acetoxy radicals.

Preferably, X is the radical —OR³ where R³ has the above mentioned meaning.

In the process, equilibration can be carried out in the presence of an acid catalyst. Preferred acid catalysts are phosphornitrilic chlorides, such as those described in U.S. Pat. No. 3,839,388 (Wacker-Chemie; issued on Oct. 1, 1974) and the corresponding DE-A 2,229,514 and U.S. Pat. No. 5,008,229 (Wacker-Chemie; issued on Apr. 16, 1991) and the corresponding DE-A 3,903,137.

In the process, the silanes of formulae (IV), (V), (VIII), (IX), (X) and (XI) are preferably chosen for equilibration wherein at least 5 mol percent of all radicals Z are halogen atoms, more preferably chlorine atoms.

The hydroxyl groups formed are stabilized by subsequent hydrolysis or mixed hydrolysis of compounds (IV) to (XI), preferably in the presence of base, such as NaHCO₃, MgO, K₂CO₃, Na₂CO₃ and/or amines, such as ammonia, triethylamine or dibutylamine, which can be used as such or in the form of their aqueous solutions.

The first step of the process is preferably carried out at a temperature of 20° to 120° C. and a pressure of 900 to 1100 hPa.

The second step of the process is preferably carried out at a temperature of 80° to 120° C. and a pressure of 900 to 1100 hPa.

Apart from the siloxane units mentioned in formula (III), further siloxane units can additionally be present to a minor extent as a consequence of the chosen method of synthesis.

Furthermore, the organopolysiloxanes prepared can also be present in the mixture with secondary components consisting of the silanes of formulae (IV), (VIII) and (IX), such as $HR^1_n[OY]_xR^2$ where $R^1$, $R^2$, Y and x have the above mentioned meaning, such as $H(OCH_2CH_2)_6$—$OCH_3$ and $H_3CCH_2CH_2$—$(OCH_2CH_2)_6$—$OCH_3$, and secondary components resulting from the reaction, such as cyclosiloxanes.

Examples of silanes of formula (IV) are H₃CSiCl₂—(CH₂)₃O(CH₂CH₂O)₅CH₃, H₃Si(OCH₃)₂—(CH₂)₃O(CH₂CH₂O)₅CH₃, H₃Si(OCH(CH₃)₂)₂—(CH₂)₃O(CH₂CH₂O)₅CH₃, H₃Si(OCH(CH₃)₂)₂—(CH₂)₃O(CH₂CH₂O)₁₅CH₃, H₃Si(OCH₂CH₃)₂—(CH₂)₃O(CH₂CH₂O)₄₄CH₃, H₃Si(OCH₃)₂—(CH₂)₃O(CH₂CHCH₃O)₂₄(CH₂CH₂O)₄₈(CH₂)₃CH₃, H₃CSi(OCH₃)₂—(CH₂)₃O(CH₂CHCH₃O)₆₆(CH₂)₃CH₃, H₃CSiCl₂—O(CH₂CH₂O)₅CH₃, PhSiCl₂—(CH₂)₆O(CH₂CH₂O)₅CH₃, H₃CSi(OCH₂CH₂CH₃)₂—(CH₂)₃O(CH₂CH₂O)₇CH₃, H₃CSiCl(OCH₂CH₃)—(CH₂)₃O(CH₂CH₂O)₃CH₃, H₃CSi(OCH(CH₃)₂)₂—(CH₂)₃O(CH₂CH₂CH₂O)₃₃(CH₂)₃CH₃, H₃CSi(OCH₃)₂—(CH₂)₃O(CH₂CH₂O)₁₅OCCH₃ and H₃CSi(OCH₃)₂—(CH₂)₃O(CH₂CH₂O)₄₄OCCH(CH₃)₂, preference being given to H₃CSiCl₂—(CH₂)₃O(CH₂CH₂O)₅CH₃, H₃CSi(OCH₃)₂—(CH₂)₃O(CH₂CH₂O)₅CH₃ and H₃CSi(OCH(CH₃)₂)₂—(CH₂)₃O(CH₂CH₂O)₅CH₃.

Examples of silanes of formula (V) are (H₃C)₂SiCl₂, H₂C=CH—Si(CH₃)₂Cl₂, Ph₂SiCl₂, Ph(H₃C)SiCl₂, H₂C=CH—(CH₂)₄—Si(CH₃)Cl₂, (H₂C=CH)PhSiCl₂, (F₃CCH₂CH₂)(H₃C)SiCl₂, (F₃CCH₂CH₂)(H₃C)Si(OCH₃)₂, (F₃CCH₂CH₂)(H₃C)Si(OCH₃)Cl, 2-(3-cyclohexenyl)-ethyl-Si(CH₃)Cl₂, (H₃C)₂Si(OCH₃)₂, H₂C=CH—Si(CH₃)(OCH₃)₂, Ph₂Si(OCH₃)₂, Ph(H₃C)Si(OCH₃)₂, H₂C=CH—(CH₂)₄—Si(CH₃)(OCH₃)₂, (H₂C=CH)PhSi(OCH₃)₂, 2-(3-cyclohexenyl)-ethyl-Si(CH₃)(OCH₃)₂, HS—CH₂—Si(CH₃)(OCH₃)₂, HS—(CH₂)₃—Si(CH₃)(OCH₃)₂, (H₃C)₂Si(OCH₂CH₃)₂, H₂C=CH—Si(CH₃)(OCH₂CH₃)₂, H₂C=CH—Si(CH₃)(OOCCH₃)₂, (H₃C)₂Si(OOCCH₃)₂, Ph₂Si(OCH₂CH₃)₂, Ph(H₃C)Si(OCH₂CH₃)₂ and H₃CCH=CH—(CH₂)₃—Si(CH₃)(OCH₂CH₃)₂, where Ph is a phenyl radical, preferably (H₃C)₂SiCl₂, H₂C=CH—Si(CH₃)Cl₂, and HS(CH₂)₃—Si(CH₃)(OCH₃)₂.

Examples of siloxanes of formula (VI) are HO[Si(CH$_3$)$_2$O]$_2$H, HO[Si(CH$_3$)$_2$O]$_{15}$H, HO[Si(CH$_3$)$_2$O]$_{35}$H, HO[Si(CH$_3$)$_2$O]$_{65}$H, HO[Si(CH$_3$)$_2$O]$_{108}$H, HO[Si(CH$_3$)$_2$O]$_{220}$H, HO[Si(CH$_3$)$_2$O]$_{644}$H, HO[Si(CH$_3$)$_2$O]$_{920}$H, HO[Si(CH$_3$)$_2$O]$_{1450}$H, HO[Si(CH$_3$)$_2$O]$_{44}$[Si(CH=CH$_2$)CH$_3$O]$_{11}$H, HO[Si(CH=CH$_2$)CH$_3$O]$_{57}$H, HO[Si(CH$_3$)$_2$O]$_{58}$[Si(Ph)CH$_3$O]$_4$H, HO[Si(CH$_3$)$_2$O]$_{118}$[Si(Ph)$_2$O]$_{14}$H, HO[Si(CH$_3$)(CH$_2$CH$_2$CF$_3$)O]$_4$H, HO[Si(CH$_3$)(CH$_2$CH$_2$CF$_3$)O]$_{23}$H, HO[Si(CH$_3$)(CH$_2$CH$_2$CF$_3$)O]$_{83}$H, HO[Si(CH$_3$)(CH$_2$CH$_2$CF$_3$)O]$_{102}$H, and HO[Si(CH$_3$)$_2$O]$_{74}$[Si(CH=CH$_2$)CH$_3$O]$_4$[HS—(CH$_2$)$_3$—Si(CH$_3$)O]$_2$H where Ph is a phenyl radical, preference being given to HO[Si(CH$_3$)$_2$O]$_{35}$H, HO[Si(CH$_3$)$_2$O]$_{220}$H, HO[Si(CH$_3$)$_2$O]$_{644}$H, and HO[Si(CH$_3$)$_2$O]$_{44}$[Si(CH=CH$_2$)CH$_3$O]$_{11}$H.

Examples of siloxanes of formula (VII) are [Si(CH$_3$)$_2$O]$_3$, [Si(CH$_3$)$_2$O]$_4$, [Si(CH$_3$)$_2$]$_5$, [Si(CH$_3$)$_2$O]$_6$, [Si(CH$_3$)PhO]$_3$, [Si(CH$_3$)PhO]$_4$, [Si(CH$_3$)PhO]$_5$, [Si(CH$_3$)PhO]$_6$, [SiPh$_2$O]$_3$, [SiPh$_2$O]$_4$, [SiPh$_2$O]$_5$, [SiPh$_2$O]$_6$, [Si(CH$_3$)(CH$_2$CH$_2$CF$_3$)O]$_3$, [Si(CH$_3$)(CH$_2$CH$_2$CF$_3$)O]$_4$, [Si(CH$_3$)(CH$_2$CH$_2$CF$_3$)O]$_5$, [Si(CH$_3$)(CH$_2$CH$_2$CF$_3$)O]$_6$, [Si(CH$_3$)(CH=CH$_2$)O]$_3$, [Si(CH$_3$)(CH=CH$_2$)O]$_4$, [Si(CH$_3$)(CH=CH$_2$)O]$_5$ and [Si(CH$_3$)(CH=CH$_2$)O]$_6$ where Ph is a phenyl radical, preference being given to [Si(CH$_3$)$_2$O]$_3$, [Si(CH$_3$)$_2$O]$_4$, [Si(CH$_3$)$_2$O]$_5$, [Si(CH$_3$)(CH$_2$CH$_2$CF$_3$)O]$_3$, and [Si(CH$_3$)(CH=CH$_2$)O]$_4$.

Examples of silanes of formula (VIII) are (H$_3$C)$_2$SiOH—(CH$_2$)$_3$O(CH$_2$CH$_2$O)$_5$CH$_3$, (H$_3$C)$_2$SiCl—(CH$_2$)$_3$O(CH$_2$CH$_2$O)$_5$CH$_3$, (H$_3$C)$_2$Si(OCH$_3$)—(CH$_2$)$_3$O(CH$_2$CH$_2$O)$_5$CH$_3$, (H$_3$C)$_2$Si(OCH(CH$_3$)$_2$)—(CH$_2$)$_3$O(CH$_2$CH$_2$O)$_{15}$CH$_3$, (H$_3$C)$_2$SiCl—(CH$_2$)$_3$O(CH$_2$CH$_2$O)$_{44}$CH$_3$, (H$_3$C)$_2$Si(OCH$_3$)—(CH$_2$)$_3$O(CH$_2$CHCH$_3$O)$_{24}$(CH$_2$CH$_2$O)$_{48}$(CH$_2$)$_3$CH$_3$, (H$_3$C)$_2$Si(OCH$_3$)—(CH$_2$)$_3$O(CH$_2$CHCH$_3$O)$_{66}$(CH$_2$)$_3$CH$_3$, (H$_3$C)$_2$SiCl—O(CH$_2$CH$_2$O)$_5$CH$_3$, Ph(H$_3$C)SiCl—(CH$_2$)$_6$O(CH$_2$CH$_2$O)$_5$CH$_3$, (H$_3$C)$_2$Si(OCH$_2$CH$_3$)—(CH$_2$)$_3$O(CH$_2$CH$_2$O)$_7$CH$_3$ and (H$_3$C)$_2$SiCl—(CH$_2$)$_3$O(CH$_2$CH$_2$CH$_2$O)$_{33}$(CH$_2$)$_3$CH$_3$, where Ph is a phenyl radical, preference being given to (H$_3$C)$_2$SiCl—(CH$_2$)$_3$O(CH$_2$CH$_2$O)$_5$CH$_3$, (H$_3$C)$_2$Si(OCH(CH$_3$)$_2$)—(CH$_2$)$_3$O(CH$_2$CH$_2$O)$_{15}$CH$_3$, and (H$_3$C)$_2$Si(OCH$_3$)—(CH$_2$)$_3$O(CH$_2$CHCH$_3$O)$_{66}$(CH$_2$)$_3$CH$_3$.

Examples of silanes of formula (IX) are SiCl$_3$—(CH$_2$)$_3$O(CH$_2$CH$_2$O)$_5$CH$_3$, Si(OCH$_3$)$_3$—(CH$_2$)$_3$O(CH$_2$CH$_2$O)$_5$CH$_3$, Si(OCH(CH$_3$)$_2$)$_3$—(CH$_2$)$_3$O(CH$_2$CH$_2$O)$_5$CH$_3$, Si(OCH(CH$_3$)$_2$)$_3$—(CH$_2$)$_3$O(CH$_2$CH$_2$O)$_{15}$CH$_3$, Si(OCH$_2$CH$_3$)$_3$—(CH$_2$)$_3$O(CH$_2$CH$_2$O)$_{44}$CH$_3$, Si(OCH$_3$)$_3$—(CH$_2$)$_3$O(CH$_2$CHCH$_3$O)$_{24}$(CH$_2$CH$_2$O)$_{48}$(CH$_2$)$_3$CH$_3$, Si(OCH$_3$)$_3$—(CH$_2$)$_3$O(CH$_2$CHCH$_3$O)$_{66}$(CH$_2$)$_3$CH$_3$, SiCl$_3$—O(CH$_2$CH$_2$O)$_5$CH$_3$, Si(OCH$_2$CH$_3$)$_3$—(CH$_2$)$_3$O(CH$_2$CH$_2$O)$_7$CH$_3$, SiCl$_2$(OCH$_2$CH$_3$)—(CH$_2$)$_3$O(CH$_2$CH$_2$O)$_3$CH$_3$, SiCl$_3$—(CH$_2$)$_3$O(CH$_2$CH$_2$CH$_2$CH$_2$O)$_{33}$(CH$_2$)$_3$CH$_3$, Si(OCH$_3$)$_3$—(CH$_2$)$_3$O(CH$_2$CH$_2$O)$_{15}$OCCH$_3$ and Si(OCH$_3$)$_3$—(CH$_2$)$_3$O(CH$_2$CH$_2$O)$_{44}$OCCH(CH$_3$)$_2$, preference being given to SiCl$_3$—(CH$_2$)$_3$O(CH$_2$CH$_2$O)$_5$CH$_3$ and Si(OCH$_2$CH$_3$)$_3$—(CH$_2$)$_3$O(CH$_2$CH$_2$O)$_{44}$CH$_3$.

Examples of silanes of formula (X) are SiCl$_4$, Si(OCH$_3$)$_4$, Si(OCH$_2$CH$_3$)$_4$, Si(OCH(CH$_3$)$_2$)$_4$, Si(OCH$_2$CH$_2$CH$_3$)$_4$, Cl$_2$Si(OCH$_3$)$_2$, ClSi(OCH$_2$CH$_3$)$_3$, Si(OOCCH$_3$)$_4$ and (H$_3$CCOO)Si(OCH$_2$CH$_3$)$_3$, preferably SiCl$_4$ and Si(OCH$_2$CH$_3$)$_4$.

Examples of silanes of formula (XI) are H$_3$CSiCl$_3$, H$_3$CSi(OCH$_3$)$_3$, H$_3$CSi(OCH(CH$_3$)$_2$)$_3$, H$_3$CSi(OOCCH$_3$)$_3$, H$_3$CSi(OCH$_2$CH$_3$)$_3$, H$_2$C=CH—SiCl$_3$, H$_2$C=CH—Si(OCH$_2$CH$_3$)$_3$, H$_2$C=CH—Si(OOCCH$_3$)$_3$, F$_3$CCH$_2$CH$_2$—SiCl$_3$, F$_3$CCH$_2$CH$_2$—Si(OCH$_2$CH$_3$)$_3$, PhSiCl$_3$, PhSi(OCH$_3$)$_3$, HS—(CH$_2$)$_3$—Si(OCH$_3$)$_3$ and HS—CH$_2$—Si(OCH$_3$)$_3$ where Ph is a phenyl radical, preference being given to H$_3$CSiCl$_3$, H$_3$CSi(OOCCH$_3$)$_3$, H$_3$CSi(OCH$_2$CH$_3$)$_3$ and HS—(CH$_2$)$_3$—Si(OCH$_3$)$_3$.

Examples of silanes of formula (XII) are H—Si(OCH$_3$)$_3$, H—Si(OCH$_3$)$_2$CH$_3$, H—Si(OCH$_3$)$_2$Cl, H—Si(OCH$_3$)$_2$N(CH$_3$)$_2$, H—Si(OCH$_2$CH$_3$)$_3$, H—Si(OCH$_2$CH$_3$)$_2$CH$_3$, H—Si(OCH$_2$CH$_3$)$_2$Cl, H—Si(OCH$_2$CH$_3$)$_2$ N(CH$_3$)$_2$, H—Si(OCH(CH$_3$)$_2$)$_3$, H—Si(OCH$_3$)(OCH(CH$_3$)$_2$), H—Si(OCH$_2$CH$_2$CH$_3$)$_3$ and H—Si(OCH$_2$CH$_2$CH$_2$CH$_3$)$_2$(OCH$_3$), preferably H—Si(OCH$_2$CH$_3$)$_3$ and H—Si(OCH (CH$_3$)$_2$)$_3$.

Examples of organopolysiloxanes of formula (III) are those of the average formula

[HSi(OEt)$_2$O$_{1/2}$]$_{1.4}$[EtOSiMe$_2$O$_{1/2}$]$_{0.6}$
[MeSi[(CH$_2$)$_3$—O(CH$_2$CH$_2$O)$_{4.8}$Me]O$_{2/2}$]$_{20}$[SiMe$_2$O$_{2/2}$]$_{53.3}$
[SiO$_{4/2}$]$_{0.5}$
[HSi(OEt)$_2$O$_{1/2}$]$_{3.1}$[MeSi[(CH$_2$)$_3$—O(CH$_2$CH$_2$O)$_{14.8}$Me]O$_{2/2}$]$_{12}$
[SiMe$_2$O$_{2/2}$]$_{43.5}$[MeSiO$_{3/2}$]$_{1.5}$
[HSiMe(OMe)O$_{1/2}$]$_{3.6}$
[MeSi[(CH$_2$)$_3$—O(CH$_2$CHCH$_3$O)$_{24}$(CH$_2$CH$_2$O)$_{48}$Me]O$_{2/2}$]$_{12}$
[(F$_3$CCH$_2$CH$_2$)SiMeO$_{2/2}$]$_{235}$[PhSiO$_{3/2}$]$_{2.5}$
[HSi(OEt)$_2$O$_{1/2}$]$_{1.57}$[EtOSiMe$_2$O$_{1/2}$]$_{0.43}$
[MeSi[(CH$_2$)$_3$—O(CH$_2$CH$_2$O)$_{5.3}$Me]O$_{2/2}$]$_{9.6}$[SiMe$_2$O$_2$]$_{35.4}$
[HSi(OEt)$_2$O$_{1/2}$]$_{1.58}$[EtOSiMe$_2$O$_{1/2}$]$_{0.42}$
[MeSi[(CH$_2$)$_3$—O(CH$_2$CH$_2$O)$_{5.2}$Me]O$_{2/2}$]$_8$[SiMe$_2$O$_{2/2}$]$_{110}$
[HSi(OEt)$_2$O$_{1/2}$]$_{1.78}$[Me$_3$SiO$_{1/2}$]$_{0.22}$
[MeSi[(CH$_2$)$_6$—O(CH$_2$CH$_2$O)$_5$CH$_3$]O$_{2/2}$]$_{34}$[SiMe$_2$O$_{2/2}$]$_{332}$
[HSi(OEt)$_2$O$_{1/2}$]$_{3.9}$[Me$_2$Si[(CH$_2$)$_3$—O(CH$_2$CH$_2$O)$_{15.8}$Me]O$_{1/2}$]$_{0.2}$
[SiMe$_2$O$_{2/2}$]$_{32}$[SiMeViO$_{2/2}$]$_6$[MeSiO$_{3/2}$]$_{2.5}$
[HSi(OiPr)$_2$O$_{1/2}$]$_{2.9}$[Si[(CH$_2$)$_3$—O(CH$_2$CH$_2$O)$_{5.3}$Me]O$_{3/2}$]$_{1.2}$
[SiMe$_2$O$_{2/2}$]$_{24}$
[HSi(OEt)$_2$O$_{1/2}$]$_{1.7}$[EtOSiMe$_2$O$_{1/2}$]$_{0.3}$
[MeSi[(CH$_2$)$_3$—O(CH$_2$CH$_2$O)$_{4.8}$Me]O$_{2/2}$]$_{12}$[SiMe$_2$O$_{2/2}$]$_{130.3}$
[SiMeViO$_{1/2}$]$_6$[SiMe[(CH$_2$)$_3$—SH]O$_{2/2}$]$_{3.7}$
[HSi(OiPr)$_2$O$_{1/2}$]$_{1.8}$[iPrOSiMe$_2$O$_{1/2}$]$_{0.2}$
[MeSi[(CH$_2$)$_3$—O(CH$_2$CHCH$_3$O)$_{66}$(CH$_2$)$_3$CH$_3$]O$_{2/2}$]$_{12}$[SiMe$_2$O$_{2/2}$]$_{221}$
[SiMeViO$_{2/2}$]$_{66}$[SiMe[(CH$_2$)$_3$—SH]O$_{2/2}$]$_{32.7}$
[HSi(OiPr)$_2$O$_{1/2}$]$_{2.8}$[MeSi[(CH$_2$)$_3$—O(CH$_2$CH$_2$O)$_{15}$CH$_3$]O$_{2/2}$]$_4$
[SiMe$_2$O$_{2/2}$]$_{17}$[Ph(H$_3$C)SiO$_{2/2}$]$_4$
[H$_2$C=CH—(CH$_2$)$_4$—SiMeO$_{2/2}$]$_6$[HS—CH$_2$—SiO$_{3/2}$]$_{2.9}$
[HSi(OEt)$_2$O$_{1/2}$]$_{3.8}$
[MeSi[(CH$_2$)$_3$—O(CH$_2$CH$_2$O)$_{44}$OCCH(CH$_3$)$_2$]O$_{2/2}$]$_8$
[SiMe$_2$O$_{2/2}$]$_{113}$[2-(3-cyclohexenyl)-ethyl-SiMeO$_{2/2}$]$_{4.2}$
[Si[(CH$_2$)$_3$—SH]O$_{3/2}$]$_{0.7}$[SiO$_{4/2}$]$_{1.1}$ and
[HSi(OEt)$_2$O$_{1/2}$]$_{1.2}$[Me$_2$SiViO$_{1/2}$]$_{0.8}$
[MeSi[(CH$_2$)$_3$—O(CH$_2$CH$_2$O)$_3$OCH$_3$]O$_{2/2}$]$_8$
[SiMe$_2$O$_{2/2}$]$_{26}$[Si[(CH$_2$)$_3$—SH]O$_{3/2}$]$_{0.7}$ where Me is a methyl radical, Et is an ethyl radical, Ph is a phenyl radical, and Vi is a vinyl radical, preferably

[HSi(OEt)$_2$O$_{1/2}$]$_{1.4}$[EtOSiMe$_2$O$_{1/2}$]$_{0.6}$
[MeSi[(CH$_2$)$_3$—O(CH$_2$CH$_2$O)$_{4.8}$Me]O$_{2/2}$]$_{20}$[SiMe$_2$O$_{2/2}$]$_{53.3}$
[SiO$_{4/2}$]$_{0.5}$
[HSi(OEt)$_2$O$_{1/2}$]$_{3.1}$[MeSi[(CH$_2$)$_3$—O(CH$_2$CH$_2$O)$_{14.8}$Me]O$_{2/2}$]$_{12}$
[SiMeO$_{2/2}$]$_{43.5}$[MeSiO$_{3/2}$]$_{1.5}$
[HSi(OEt)$_2$O$_{1/2}$]$_{1.57}$[EtOSiMe$_2$O$_{1/2}$]$_{0.43}$
[MeSi[(CH$_2$)$_3$—O(CH$_2$CH$_2$O)$_{5.3}$Me]O$_{2/2}$]$_{9.6}$[SiMe$_2$O$_{2/2}$]$_{35.4}$ and
[HSi(OEt)$_2$O$_{1/2}$]$_{1.7}$[EtOSiMe$_2$O$_{1/2}$]$_{0.3}$
[MeSi[(CH$_2$)$_3$—O(CH$_2$CH$_2$O)$_{4.8}$Me]O$_{2/2}$]$_{12}$[SiMe$_2$O$_{2/2}$]$_{130.3}$
[SiMeViO$_{2/2}$]$_6$[SiMe[(CH$_2$)$_3$—SH]O$_{2/2}$]$_{3.7}$ The process has the advantage that the organopolysiloxanes containing hydrophilic groups can be prepared in a very simple manner from available industrial materials. It is possible to prepare a multiplicity of different products having a very specific property profile.

Another advantage of the process is that there is no need for any organic solvent.

The organopolysiloxanes containing hydrophilic groups can be crosslinked in a known manner by intake of moisture, making it possible for the moisture crosslinking to be accelerated by addition of carboxylic acids, such as oleic acid or 2-ethylhexanoic acid. If the organopolysiloxanes, in addition to hydrophilic groups, also contain photocrosslinkable groups such as vinyl groups or mercapto groups, they can be crosslinked by means of high-energy radiation, it being possible for the radiation crosslinking to be accelerated by addition of suitable photoinitiators. For both moisture crosslinking and radiation crosslinking, see the above mentioned WO 93/00405.

The organopolysiloxanes containing hydrophilic groups can be used wherever permanent hydrophilicity is desired, particularly where the hydrophobicity of moisture-crosslinkable silicones have previously prevented them from being used and the advantages of rapid moisture crosslinking catalyzed under mild conditions have a beneficial effect, for example

- as component of coating materials for textiles, wood, glass, concrete, stone, paper, cardboards, cork, ceramics, plastic sheets, such as PVC sheets, polyester sheets, PE sheets, metal objects and bonded fabrics;
- as component of primers for improving water wettability or adhesion of RTV 2-component addition silicone rubber, RTV 2-component condensation silicone rubber of RTV 1-component condensation silicone rubber, for example in order to enable vulcanized products to be overcoated with water-containing paint emulsion, or as soil-release additive;
- as component of RTV 2-component addition silicone rubber, RTV 2-component condensation silicone rubber or RTV 1-component condensation silicone rubber compositions for improving water wettability, for example in impression compounds (hydrophilic modifier which can be incorporated by crosslinking);
- as component of electrically conductive mixtures, for example in dry batteries;
- as component of implants for improving tissue compatibility or in drug-release implants or other active compound-releasing mixtures (fungicides, bactericides etc.) for improving the controlled release of active compound;
- as component of antifogging and deicing coatings, for example for vehicle and airplane windows, or of antifouling coatings for ship hulls, and
- as a degassing additive or compatibilizer in coatings and paints.

If the organopolysiloxanes contain not only moisture crosslinkable but also radiation crosslinkable groups, they can also be used in the areas of application given in the above mentioned WO 93/00405.

In the examples described below, parts and percentages are by weight, unless otherwise stated. Unless stated the examples below are carried out at a pressure of the surrounding atmosphere, i.e., at about 1000 hPa, and at room temperature, i.e., at about 23° C., or at a temperature obtained upon combining the reactants at room temperature without additional heating or cooling. The relative humidity is between 60% and 80%, unless stated otherwise. All viscosities given below are based on a temperature of 25° C.

Abbreviations below are,

Me is a methyl radical

Et is an ethyl radical

Vi is a vinyl radical iPr is an iso-propyl radical.

EXAMPLE 1

(a) Silane synthesis:

A mixture of 1000 g of a polyglycol ether of the average formula $H_2C=CHCH_2(OC_2H_4)_4OMe$ (sold by Hoechst AG under the name "Polyglycol AM 250") and 14.6 g of 1% solution of the bis(1,1,3,3-tetramethyl-1,3-divinyldisiloxane)-Platinum complex in hexane (=100 ppm of Pt) is made to react with 460 g of dichloromethylsilane at 70° C. After distilling of the volatiles at 50° C./4 hPa, 1326 g of a yellowish oil remain as residue which is reacted with 1440 g of isopropanol Distillation up to 200° C./2 hPa gives 822 g of a yellowish liquid of the average formula $MeSi(OiPr)_2$—$(CH_2CH_2O)_{4.8}Me$ as residue.

(b) Polysiloxane Synthesis:

0.14 g of phosphonitrile chloride ("$PNCl_2$") is added at room temperature to 100 g of an OH—terminated polydimethylsiloxane having a chain length of about 220 $Me_2SiO$ units (viscosity=1 Pa.s; sold by Wacker-Chemie GmbH) and 2.5 g of $SiCl_4$, and the resulting mixture is heated to 100° C. with stirring. 93 g of $MeSi(OiPr)_2$—$(CH_2CH_2O)_{4.8}Me$, the preparation of which is described above under (a), are metered in at 100° C. over a period of one hour. After addition of a further 0.14 g of $PNCl_2$, stirring at 100° C. is continued for another hour. The mixture is then hydrolyzed with 45 ml of water. Volatiles are distilled off at 130° C./2 hPa. After cooling to 110° C., 1 g of BHT (=2,6-di-t-butyl-p-methylphenol) and 30 g of triethoxysilane are added to the reaction mixture, which is then refluxed for one hour until excess silane is distilled off at 120° C./3 hPa. This leaves a residue of 125 g of a clear oil having a viscosity of 90 $mm^2/s$, which, based on the $^{29}Si$ and $^1H$ NMR spectra can be assigned the following average formula:

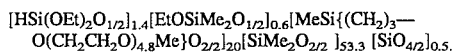

EXAMPLE 2

23.6 g of dichloromethylvinylsilane and 0.09 g of $PNCl_2$ are added at 90° C. to a mixture of 315 g of an OH-terminated polydimethylsiloxane having a chain length of about 420 $Me_2SiO$ units (viscosity 6 Pa.s; sold by Wacker-Chemie GmbH), 60.4 g of an OH-terminated polysiloxane of the average formula $HO(SiMe_2O_{2/2})_{9.6}(SiMeVi_{2/2})_{2.4}H$ (sold by Wacker-Chemie GmbH) and 0.21 g of BHT (=2,6-di-t-butyl-p-methylphenol). 28.9 g of the silane of the formula $Me(MeO)_2Si(CH_2)_3$—SH are metered in over a period of 45 minutes. After repeated addition of 0.09 g of $PNCl_2$, 200 g of $MeSi(OiPr)_2$—$(CH_2)_3$—$O(CH_2CH_2O)_{4.8}Me$, the preparation of which is described in Example 1 under (a), are metered in at 90° C. over a period of one hour. The mixture is stirred at 100° C. for one hour. It is then hydrolyzed with a solution of 15 g of sodium bicarbonate in 200 ml of water. Volatiles are distilled off at 130° C./1 hPa. After cooling to room temperature, 2 g of BHT (=2,6-di-t-butyl-p-methylphenol) and 103 g of triethoxysilane are added to the reaction mixture, which is then refluxed for one hour before excess silane is distilled off at 120° C./1 hPa. Filtration of the residue gives 427 g of a clear yellowish oil having a viscosity of 330 $mm^2/s$, which, based on the $^{29}Si$ and $^1H$ NMR spectra can be assigned the following average formula:

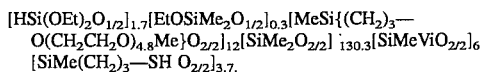

EXAMPLE 3

10 g of the siloxane from Example 1 are knife-coated onto a glass plate in a film thickness of about 0.1 mm. A sample of the substrate thus coated exhibits a skinning time of 15 minutes in the presence of air.

EXAMPLE 4

10 g of the siloxane from Example 2 are thoroughly mixed with 0.1 g of oleic acid and 0.4 g of 2-hydroxy-2-methyl-1-phenyl-1-propanone (sold by Merck, Darmstadt, FRG, under the name Darocure 1173). The mixture thus obtained is knife-coated onto a glass plate in a film thickness of about 0.1 mm. A sample exhibits a skinning time of 20 minutes in air in the absence of light.

Another sample of the substrate thus coated is irradiated in the presence of air by irradiating the coating with UV light for 10 seconds at an output of 80 watt/cm of illuminated length and output maxima at a wavelength of 313 nm and 361 nm at a distance of 15 cm from the surface to be crosslinked (UV laboratory dryer, model 22/3, from Bentron GmbH, Rödermark, FRG), as a result of which the coating is cured to give a dry surface. One drop of demineralized water is applied to the coated glass plate thus obtained by means of a pipette. After 30 seconds, the diameter of the wetted area has doubled.

Comparative Example 1

(water wettability)

2400 g of α,ω-dihydroxydiorganopolysiloxane containing, as the diorganosiloxy units, on average 60 dimethylsiloxy units, 4 vinylmethylsiloxy units and 2 $HS(CH_2)_3SiCH_3O_{2/2}$ units and having a viscosity of about 100 mPa.s, 328 g of hydrogentriethoxysilane and 13.6 g of pentanedione are thoroughly mixed in the absence of moisture, the mixture is heated to 100° C., stirred at 100° C. for 1 hour, and the volatiles are removed by brief evacuation (15 minutes/1 mbar). The mixture is then filtered through cellulose. This gives 2513 g of a clear colorless oil having a viscosity of 118 mPa.s which, based on $^{29}Si$ NMR spectroscopy, contains 93% of H—Si—$(OEt)_2$ terminal groups, relative to the number of all terminal groups.

100 parts of this siloxane are thoroughly mixed with 1 part of oleic acid and 0.2 part of 2-hydroxy-2-methy-1-phenyl-1-propanone (sold by Merck, Darmstadt, FRG, under the name Darocure 1173). The mixture thus obtained, which is a clear colorless oil having a viscosity of 116 mPa.s, is knife-coated onto a glass plate in a film thickness of about 0.1 mm. A sample of the substrate thus coated is irradiated in the presence of air by irradiating the coating with UV light for 10 seconds at an output of 80 watt/cm of illuminated length and output maxima at a wavelength of 313 nm and 361 nm at a distance of 15 cm from the surface to be crosslinked (UV laboratory dryer, model 22/3, from Bentron GmbH, Rödermark, FRG), as a result of which the coating is cured to give a dry surface.

One drop of dimineralized water is applied to the coated glass plate thus obtained by means of a pipette. After 30 minutes, shape and wetting area of the water drop are unchanged.

What is claimed is:

1. An organopolysiloxane comprising at least one unit (A) of the formula $$(R^3O)_m SiHR_{2-m}O_{1/2} \qquad (I)$$

and at least one unit (B) selected from the group consisting of $ER_2SiO_{1/2}$, $ERSiO_{2/2}$ and $ESiO_{3/2}$, in which R is a monovalent SiC-bonded optionally substituted hydrocarbon radical having 1 to 12 carbon atoms, $R^3$ is a monovalent optionally substituted hydrocarbon radical, m is 1 or 2, and E is a radical of the formula $$—R^1_n[OY]_x R^2 \qquad (II)$$

in which $R^1$ is an alkylene radical having 1 to 6 carbon atoms, n is 0 or 1,

Y is alkylene groups having 1 to 4 carbon atoms, $R^2$ is an alkoxy radical having 1 to 6 carbon atoms or an oxycarbonylalkyl radical having 1 to 6 carbon atoms, and x is an integer from 1 to 200.

2. An organopolysiloxane as claimed in claim 1, wherein the proportion of siloxane units (A) is between 0.2% and 67%, relative to the total number of the siloxane units present in the organopolysiloxane.

3. An organopolysiloxane as claimed in claim 1, wherein the proportion of siloxane units (B) is between 1% and 70%, relative to the total number of the siloxane units present in the organopolysiloxane.

4. An organopolysiloxane as claimed in claim 1, wherein the organopolysiloxane is one of the formula $$[(R^3O)_m HSiR_{2-m}O_{1/2}]_a[(R^3O)R_2SiO_{1/2}]_b[ER_2SiO_{1/2}]_c[ERSiO_{2/2}]_d$$
$$[R_2SiO_{2/2}]_e[SiO_{4/2}]_f[RSiO_{3/2}]_g[ESiO_{3/2}]_h \qquad (III)$$

in which

R, E, $R^3$ and m have the above mentioned meaning and a is from 1 to 8, b and c are each from 0 to 8, d is 0 to 280, e is 0 to 396, f is 0 to 3, g is 0 to 6, and h is 0 to 3, wherein a+b+c is 2 to 8, c+d+h is 1 to 280, a+b+c+d+e+f+g+h is 3 to 400, and the ratio of the sum of a+b+e+f+g to that of c+d+h is 100:1 to 1:1.

5. An organopolysiloxane as claimed in claim 1, wherein the organopolysiloxane contains SiC-bonded mercapto-substituted hydrocarbon radicals and SiC-bonded radicals having an aliphatic carbon-carbon multiple bond.

6. An organopolysiloxane as claimed in claim 5, wherein the ratio of SiC-bonded mercapto-substituted hydrocarbon radicals to the SiC-bonded radicals having an aliphatic carbon-carbon multiple bond is between 10:1 and 1:10.

7. A process for preparing organopolysiloxanes as claimed in claim 1, comprising in a first step reacting;

A a silane of the formula $$ERSiZ_2 \qquad (IV),$$

with

B compounds selected from the group consisting of general formulae $$R_2SiZ_2 \qquad (V),$$

HO(SiR$_2$O)$_i$H  (VI), and (SiR$_2$O)$_j$  (VII), and in a second step reacting the product of the first step with a silane of the general formula (R$^3$O)$_m$HSiR$_{2-m}$X  (XII), in which
E is a radical of the formula —R$^1_n$[OY]$_x$R$^2$  (II)

where
R$^1$ is an alkylene radical having from 1 to 6 carbon atoms
n is 0 or 1
Y is an alkylene group having from 1 to 4 carbon atoms
R$^2$ is an alkoxy radical having 1 to 6 carbon atoms or an oxycarbonylalkyl radical having from 1 to 6 carbon atoms, and
x is an integer from 1 to 200;
R is a monovalent SiC-bonded optionally substituted hydrocarbon radical having from 1 to 12 carbon atoms,
R$^3$ is a monovalent optionally substituted hydrocarbon radical
X is a halogen atom, —OR$^3$, —NR—C(=O)R, —OC(=O)R or —NR$_2$,
Z is a hydroxyl group, a halogen atom, an alkoxy radical or an oxycarbonylalkyl radical,
i is an integer from 2 to 2000,
j is an integer from 3 to 6, and
m is 1 or 2.

* * * * *